United States Patent [19]

Porter, Jr. et al.

[11] 4,115,472

[45] Sep. 19, 1978

[54] URETHANE COATING COMPOSITIONS

[75] Inventors: Samuel Porter, Jr., Tarentum; Bruce N. McBane, Gibsonia, both of Pa.

[73] Assignee: PPG Industries, Inc., Pittsburgh, Pa.

[21] Appl. No.: 805,753

[22] Filed: Jun. 13, 1977

Related U.S. Application Data

[63] Continuation-in-part of Ser. No. 559,957, Mar. 19, 1975, abandoned.

[51] Int. Cl.$^2$ .................... C08L 63/10; C08L 75/04
[52] U.S. Cl. ..................... 260/836; 260/33.6 UB; 260/859 R; 428/425
[58] Field of Search ..................... 260/859 R, 836

[56] References Cited

U.S. PATENT DOCUMENTS

| | | | |
|---|---|---|---|
| 3,317,635 | 6/1927 | Osmond et al. | 260/836 |
| 3,538,185 | 11/1970 | Davis et al. | 260/836 |
| 3,702,836 | 11/1972 | Walbridge | 260/836 |
| 3,751,412 | 3/1973 | Nakahara et al. | 260/836 |
| 3,888,945 | 6/1975 | Arndt et al. | 260/836 |

*Primary Examiner*—Harry Wong, Jr.
*Attorney, Agent, or Firm*—George D. Morris

[57] ABSTRACT

Polyurethane coating compositions having improved application characteristics as well as other desirable properties are prepared by adding insoluble crosslinked acrylic polymer microparticles to solutions comprising an ungelled hydroxyl-containing urethane reaction product. The compositions may be spray coated onto various substrates in two coat applications to form coatings having improved film build, pattern control and flow control while maintaining the gloss characteristics of the film. These coatings are useful in general coating applications and are particularly useful on resilient and rubbery substrates such as foams or extruded rubber.

15 Claims, No Drawings

URETHANE COATING COMPOSITIONS

CROSS-REFERENCE TO RELATED APPLICATION

This application is a continuation-in-part of application Ser. No. 559,957, filed Mar. 19, 1975, now abandoned.

BACKGROUND OF THE INVENTION

There are many fields in which it is desirable to use polyurethane coating compositions for purposes of protection and for aesthetic reasons.

For reasons of economy, it is important that such coating compositions be applied rapidly and efficiently. In particular, with the constant striving for higher productivity in industry, methods of applying coatings (e.g., paints) to yield a standard film thickness in two coats instead of three or more and which still produce a serviceable coating is clearly a desirable goal to those concerned with application of coatings in production.

In the automotive industry, for example, which is one of the important applications for polyurethane coatings, the problem of coating application acquires specific urgency. Competitive pressure requires the original production finishing of automobiles to make the most effective use of labor and materials. Economizing production line space and the capability of increasing speed of completing unit operations such as painting therefore become important. Topcoat finishing, for example, that can achieve the same protective film thickness and beauty with two spray applications when three or more are standard practice, is regarded as a valuable modification.

Prior to this invention, commercial polyurethane enamel topcoats required at least three spray applications, particularly when pigmentation contained metallic flake, to deposit films of requisite thickness and appearance. This invention concerns the solution of the above-mentioned problems and additionally realizes further advantages to be mentioned below.

BRIEF SUMMARY OF THE INVENTION

The invention is primarily concerned with improvements in polyurethane enamels such as increased efficiency of application, the ability to apply a satisfactory coating in two coats rather than three, and the achievement of high gloss and excellent metallic pattern control to give an aesthetically pleasing appearance.

It has now been found that the addition of insoluble crosslinked acrylic polymer microparticles to solutions of polyurethane resins results in compositions which are capable of being sprayed to a high film build in two coats with increased coating efficiency and the films formed have dramatically improved pattern control and resistance to solvent popping while film gloss is maintained. The ability to add such crosslinked acrylic polymer microparticles to polyurethane coatings without decreasing gloss is unexpected and surprising since additives to such compositions heretofore generally produced a dulling (i.e., flatting) of the film surface.

DETAILED DESCRIPTION OF THE INVENTION

The compositions of the invention contain as one component an isocyanate-modified resin containing hydroxyl groups and formed by reacting a polyhydric material with an organic polyisocyanate. The isocyanate modified resin is combined with the crosslinked polymeric microparticles and, if desired, curing agents (such as aminoplasts) and other additives to provide coating compositions having the improved properties.

The polyhydric material preferably contains a polymeric polyol such as a polyether polyol, a polyester polyol, or an acrylic polyol. The polymeric polyol should be predominantly linear (that is, absence of crosslinks) to avoid gelling of the resultant polymeric product and should have a molecular weight of between 500 and 5000.

As examples of polyether polyols, any suitable polyalkylene ether polyol may be used including those which have the following structural formula:

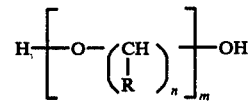

where R is hydrogen or lower alkyl and $n$ is typically from 2 to 6 and $m$ is from 2 to 100 or even higher. Included are poly(oxytetramethylene)glycols, poly(oxyethylene)glycols, poly(oxytrimethylene)glycols, poly(oxypentamethylene)glycols, polypropylene glycols, etc. Also useful are polyether polyols formed from the oxyalkylation of various polyols, for example, glycols such as ethylene glycol, 1,6-hexanediol and the like, or higher polyols, such as trimethylol propane, trimethylolethane, pentaerythritol and the like. Polyols of higher functionality which can be utilized as indicated can be made, for instance, by oxyalkylation of compounds as sorbitol or sucrose.

Also suitable are polyhydric polythioethers such as, for example, the condensation product of thioglycol or the reaction product of a polyhydric alcohol with thioglycol or any other suitable glycol.

Polyester polyols can also be used as a polymeric polyol component in making the polyurethane utilized in the practice of the invention. Such polyester polyols can be prepared by the polyesterification of organic polycarboxylic acids or anhydrides thereof with organic polyols. Usually, the polycarboxylic acids and polyols are aliphatic or aromatic dibasic acids and diols, although a minor amount, i.e., up to about 25 mole percent of polyols and polybasic acids having a functionality of 3 or more, can be used. However, the use of higher functionality polybasic acids and polyols must be carefully controlled so as to avoid gelling in the resultant polymeric product. Diols which are usually employed in making the polyester include alkylene glycols, such as ethylene glycol, propylene glycol, butylene glycol, hexylene glycol and neopentyl glycol and other glycols such as hydrogenated Bisphenol A, cyclohexane dimethanol, caprolactone diol (for example, the reaction product of caprolactone and ethylene glycol), hydroxyalkylated bisphenols, polyether glycols, for example, poly(oxytetramethylene)glycol and the like. However, other diols of various types and, as indicated, polyols of higher functionality can also be utilized, including for example, trimethylolpropane, trimethylol ethane, pentaerythritol, and the like, as well as higher molecular weight polyols such as those produced by oxyalkylating low molecular weight polyols.

The acid component of the polyester consists primarily of monomeric carboxylic acids or anhydrides having 2 to 14 carbon atoms per molecule. The acid should have an average functionality of at least about 1.9; the acid component in most instances contains at least 75 mole percent of dicarboxylic acids or anhydrides. The functionality of the acid component is based upon considerations similar to those discussed above in connection with the alcohol component, the total functionality of the system being kept in mind.

Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid, and other dicarboxylic acids of varying types. The polyester may include minor amounts of monobasic acid, such as benzoic acid, and there may also be employed higher polycarboxylic acids such as trimellitic acid and tricarballylic acid (where acids are referred to above, it is understood that the anhydrides of those acids which form anhydrides can be used in place of the acid). It is preferred that the polyester include an aliphatic dicarboxylic acid as at least part of the acid component.

The polyester polyols useful herein also include polyesteramide polyols, and polyhydric compounds having polyester structures but not formed from the reaction of an alcohol and an acid. Examples of this latter type include the so-called lactone polyesters, such as polycaprolactone polyols, as described in U.S. Pat. No. 3,169,945 to Hostettler et al.

Besides polyether and polyester polyols, useful polyols include hydroxyl-containing interpolymers of ethylenically unsaturated monomers. Examples of such interpolymers are the so-called acrylic polyols, which include interpolymers of a hydroxyalkyl ester of an ethylenically unsaturated carboxylic acid and one or more copolymerizable ethylenically unsaturated compounds.

The preferred interpolymers are those containing hydroxy groups derived from monoacrylates or methacrylates of a diol such as hydroxyalkyl acrylates and methacrylates. Examples include acrylic acid and methacrylic acid esters of ethylene glycol and 1,2-propylene glycol such as hydroxyethyl acrylate and methacrylate and hydroxypropyl methacrylate as well as polyethylene glycol monoacrylate and polycaprolactone diol or polyol monoacrylate. Hydroxybutyl acrylate, hydroxyoctyl methacrylate, and the like are further examples of the hydroxyalkyl esters of the interpolymer. Also useful are the hydroxy-containing esters of such unsaturated acids as maleic acid, fumaric acid, itaconic acid, and the like. The hydroxyalkyl ester is interpolymerized with any ethylenically unsaturated compound copolymerizable with the ester, the polymerization taking place through the ethylenically unsaturated linkages; acrylic monomers and vinyl aromatic hydrocarbon monomers are often utilized. Functional monomers, such as acrylamide, N-alkoxyalkyl acrylamides and masked or blocked ethylenically unsaturated isocyanates may also be used.

One particularly preferred class of acrylic polyols comprises interpolymers of hydroxyethyl acrylate or methacrylate, one or more lower alkyl acrylates and, if desired, an unsaturated nitrile and an N-alkoxymethyl acrylamide.

Besides polymeric polyols, low molecular polyols, that is those having molecular weights up to 250, can be employed as part or all of the polyhydric material. The low molecular weight polyols include diols, triols and higher alcohols. Such materials include aliphatic polyols particularly alkylene polyols containing from about 2 to 15 carbon atoms. Examples include ethylene glycol, 1,2-propanediol, 1,4-butanediol, 1,6-hexanediol, 2-methyl-1,3 pentanediol; cycloaliphatic polyols such as 1,2-cyclohexanediol, 1,2-bis(hydroxymethyl)cyclohexane and cyclohexane dimethanol. Examples of triols and higher alcohols include trimethylol propane, trimethylol ethane, glycerol, and pentaerythritol. Also useful are polyols containing ether linkages such as diethylene glycol, and triethylene glycol.

To produce optimum coatings, the overall functionality per unit weight of the reaction system should be controlled. Preferably, there should not be present more than about one gram-mole of acids and/or alcohols having a functionality of 3 or more, per 500 grams of the total weight of these compounds. By "functionality" is meant the number of reactive hydroxyl and carboxyl groups per molecule, with anhydride groups being considered as equivalent to two carboxyl groups. It can be noted that certain compounds contain both hydroxyl and carboxyl groups; examples are 6-hydroxyhexanoic acid, 8-hydroxyoctanoic acid, tartaric acid, etc.

The organic polyisocyanate which is reacted with the polyhydric material as described is essentially any polyisocyanate, e.g., hydrocarbon polyisocyanates or substituted hydrocarbon diisocyanates. Many such organic polyisocyanates are known in the art, including p-phenylene diisocyanate, biphenyl diisocyanate, toluene diisocyanate, 3,3'-dimethyl-4,4'-biphenylene diisocyanate, 1,4-tetramethylene diisocyanate, hexamethylene diisocyanate, 2,2,4-trimethylhexane-1,6 diisocyanate, methylene bis(phenyl isocyanate), lysine diisocyanate, bis(isocyanatoethyl)fumarate, isophorone diisocyanate and methyl cyclohexyl diisocyanate. There can also be employed isocyanate-terminated adducts of diols, such as ethylene glycol, 1,4-butylene glycol, polyalkylene glycols, etc. These are formed by reacting more than one mole of a diisocyanate, such as those mentioned, with one mole of a diol to form a longer chain diisocyanate. Alternatively, the diol can be added along with the diisocyanate.

While diisocyanates are preferred, higher polyisocyanates can be utilized as part of the organic polyisocyanate. Examples are 1,2,4-benzene triisocyanate and polymethylene polyphenyl isocyanate.

It is preferred to employ an aliphatic diisocyanate, since it has been found that these provide better color stability in the finished coating. Examples include bis-(isocyanatocyclohexyl)methane, 1,4-butylene diisocyanate and methylcyclohexyl diisocyanate. The proportions of the diisocyanate and the polyhydric material are chosen so as to provide a hydroxyl-containing product. This can be accomplished by utilizing a less than stoichiometric amount of polyisocyanate, i.e., less than one isocyanate group per hydroxyl group in the polyhydric material. Higher (e.g., stoichiometric or excess) isocyanate levels can be present if the reaction is terminated at the desired stage, as by addition of a compound which reacts with the residual isocyanate groups; water, alcohols and amines are examples of such compounds.

In one especially desirable embodiment of the invention, a polyfunctional alcohol is used to terminate the reaction at the desired stage (determined by the viscosity), thereby also contributing residual hydroxyl groups. Particularly desirable for such purposes are aminoalcohols, such as ethanolamine, diethanolamine and the like, since the amino groups preferentially react with the isocyanate groups present. Polyols, such as ethylene glycol, trimethylolpropane and hydroxyl-terminated polyesters, can also be employed in this manner.

While the ratios of the components of the polyhydric material, the polyisocyanate and any terminating or blocking agent can be varied, it will be noted by those skilled in the art that the amounts should be chosen so as to avoid gellation and to produce an ungelled, urethane reaction product containing hydroxyl groups. The hydroxyl value of the urethane reaction product should be at least 10 and preferably 20 to about 200.

The urethane reaction product as described above can optionally be mixed with a curing agent, along with the crosslinked polymeric microparticles, to provide the coating composition. Other additive materials such as polymeric polyols of low glass transition temperature (which can be added before, during or after the reaction to form the urethane reaction product) can also be employed.

The curing agent, when one is used, can be, for example, an aminoplast resin, i.e., an aldehyde condensation product of melamine, urea, benzoguanamine or a similar compound; products obtained from the reaction of formaldehyde with melamine, urea or benzoguanamine are most common and are preferred herein. The aminoplast resins utilized contain methylol or similar alkylol groups, and in most instances, at least a portion of these alkylol groups are etherified by a reaction with an alcohol, such as methanol, butanol, 2-ethylhexanol, or the like.

Other curing agents include phenolic resins formed by the condensation of an aldehyde and a phenol. A common phenolic resin is phenolformaldehyde resin.

Any blocked or masked organic polyisocyanate may also be used as the curing agent herein. The conventional organic polyisocyanates, as described above, which are blocked with a volatile alcohol, gamma-caprolactam, ketoximes or the like, so that they will be unblocked at temperatures above 100° C. may be used. Masked polyisocyanates, as is known in the art, are not derived from isocyanates, but do produce isocyanate groups upon heating at elevated temperatures. Examples of useful masked polyisocyanates include diaminimides [(e.g.,

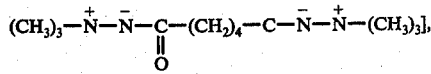

adiponitrile dicarbonate, and the like.

The curing agent may comprise up to about 60 percent by weight of the coating composition and in many cases, preferably comprises from about 4 to about 50 percent by weight of the coating composition.

As indicated, the compositions of the invention are prepared by adding insoluble crosslinked acrylic polymer microparticles (described hereinafter) to solutions or dispersions of the above-described urethane reaction product. The solvents employed in forming such solutions and dispersions are well known and may be any of those conventionally employed in the polyurethane coatings art. Accordingly, any solvent or solvent mixture in which the urethane reaction product and aminoplast resin are compatible and soluble and/or dispersible to the desired extent may be utilized. When water is desired to be utilized as the solvent medium, it is often preferable to include in the urethane reaction product salt groups which impart the desired degree of solubility or dispersibility in water. Such a technique is described in U.S. Pat. No. 3,479,310 to Dieterich et al.

The insoluble crosslinked acrylic polymer microparticles are added to the above-described components to form the improved coating compositions of the invention.

The crosslinked acrylic polymer microparticles employed in the compositions herein are prepared by the free radical addition copolymerization of alpha, beta-ethylenically unsaturated monocarboxylic acid, at least one other copolymerizable monoethylenically unsaturated monomer and crosslinking monomer selected from the group consisting of (1) epoxy group-containing compound and (2) a mixture of alkylenimine and organoalkoxysilane in the presence of a polymeric dispersion stabilizer and dispersing liquid in which the crosslinked acrylic polymer particles are insoluble, thereby forming a non-aqueous dispersion of the crosslinked acrylic polymer microparticles of relatively high concentration. The reaction is carried out at elevated temperature such that the dispersion polymer first forms and then is crosslinked; usually the temperature should be between about 50° C. and 150° C. For a detailed description of the preferred crosslinked polymeric microparticles and their method of preparation, reference may be had to copending application Ser. No. 559,949, filed Mar. 19, 1975, in the names of Joseph M. Makhlouf and Samuel Porter, Jr., now abandoned, and copending application Ser. No. 805,679, filed on even date herewith, also in the names of Joseph M. Makhlouf and Samuel Porter, Jr. Both applications are incorporated herein by reference.

Examples of alpha, beta-ethylenically unsaturated monocarboxylic acid which may be used are acrylic acid, methacrylic acid, ethacrylic acid, alpha-chloroacrylic acid, crotonic acid, isocrotonic acid, tiglic acid and angelic acid. The preferred alpha, beta-ethylenically unsaturated monocarboxylic acids are acrylic acid and methacrylic acid. Methacrylic acid is especially preferred. The amount of alpha, beta-ethylenically unsaturated monocarboxylic acid employed in the process of the invention is usually in the range of from about 0.5 percent to about 15 percent by weight of the monomers used in the copolymerization process.

Various other monoethylenically unsaturated monomers may be copolymerized with the acid monomer in the practice of this invention. Although essentially any copolymerizable monoethylenic monomer may be utilized, depending upon the properties desired, the preferred monoethylenically unsaturated monomers are the alkyl esters of acrylic or methacrylic acid, particularly those having from about 1 to about 4 carbon atoms in the alkyl group. Illustrative of such compounds are the alkyl acrylates, such as methyl acrylate, ethyl acrylate, propyl acrylate, and butyl acrylate and the alkyl methacrylates, such as methyl methacrylate, ethyl methacrylate, propyl methacrylate and butyl methacrylate. Other ethylenically unsaturated monomers which may advantageously be employed include, for example, the vinyl aromatic hyrocarbons, such as styrene, alpha-methyl styrene, vinyl toluene, unsaturated esters of organic and inorganic acids, such as vinyl acetate, vinyl chloride and the like, and unsaturated nitriles, such as acrylonitrile, methacrylonitrile, ethacrylonitrile, and the like. From about 70 percent to about 99 percent by weight of such monoethylenically unsaturated monomers, based on the weight of monomer solids can be utilized.

As indicated above, the crosslinking monomer emloyed in the practice of the invention is selectd from the group consisting of (1) epoxy group-containing compound and (2) a mixture of alkylenimine and organoalkoxysilane.

A particularly preferred class of epoxy-containing compounds which may be utilized in the practice of the invention are monoepoxide compounds which additionally contain ethylenic unsaturation. Illustrative of such preferred compounds are, for example, glycidyl acrylate and glycidyl methacrylate.

Various alkylenimines can be utilized in the practice of the invention including substituted alkylenimines. The preferred class of such amines are those of the formula:

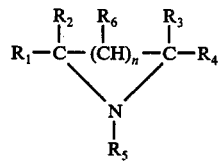

where $R_1$, $R_2$, $R_3$, $R_4$ and $R_5$ are each hydrogen; alkyl, such as methyl, ethyl, propyl, or the like, having, for example, up to about 20 carbon atoms; aryl, such as phenyl or the like; aralkyl, such as tolyl, xylyl or the like; or aralkyl, such as benzyl, phenethyl or the like. $R_6$ in the above formula is hydrogen or a lower alkyl radical usually having not more than about 6 carbon atoms, and $n$ is an integer from 0 to 1.

It is intended that the groups designated by the above formula include substituted radicals of the classes indicated where the substituent groups do not adversely affect the basic nature of the imine in the reaction. Such substituents can include the groups such as cyano, halo, amino, hydroxy, alkoxy, carbalkoxy and nitrile. The substituted groups may thus be cyanoalkyl, haloalkyl, aminoalkyl, hydroxyalkyl, alkoxyalkyl, carbalkoxyalkyl, and similar substituted derivatives of aryl, alkaryl and aralkyl groups where present.

A number of specific examples of alkylenimines within the class described are as follows:

Ethylenimine (aziridine)
1,2-propylenimine (2-methyl aziridine)
1,3-propylenimine (azetidine)
1,2-dodecylenimine (2-decyl aziridine)
1,1-dimethyl ethylanimine (2,2-dimethyl aziridine)
Phenyl ethylenimine (2-phenyl aziridine)
Benzyl ethylenimine (2-phenylmethyl aziridine)
Hydroxyethyl ethylenimine (2-(2-hydroxyethyl)aziridine)
Aminoethyl ethylenimine (2-(2-aminoethyl)aziridine)
2-methyl propylenimine (2-methyl azetidine)
3-chloropropyl ethylenimine (2-(3-chloropropyl)aziridine)
Methoxyethyl ethylenimine (2-(2-methoxyethyl)aziridine)
Dodecyl aziridinyl formate (dodecyl 1-aziridinyl carboxylate)
N-ethyl ethylenimine (1-ethyl aziridine)
N-(2-aminoethyl)ethylenimine (1-(2-aminoethyl)aziridine)
N-(phenethyl)ethylenimine (1-(2-phenylethyl)aziridine)
N-(2-hydroxyethyl)ethylenimine (1-(2-hyroxyethyl)aziridine)
N-(cyanoethyl)ethylenimine (1-cyanoethyl aziridine)
N-phenyl ethylenimine (1-phenyl aziridine)
N-(p-chlorophenyl)ethylenimine (1-(4-chlorophenyl)aziridine)

Because of their availability and because they have been found to be among the most effective, the preferred imines are hydroxyalkyl-substituted alkylenimines, such as N-hydroxyethyl ethylenimine and N-hydroxyethyl propylenimine.

Organoalkoxysilane monomers which may advantageously be employed in the practice of this invention are the acrylatoalkoxysilanes, methacrylatoalkoxysilanes and the vinylalkoxysilanes. Illustrative of such compounds are acryloxypropyltrimethoxysilane, gamma-methacryloxypropyltrimethoxysilane, gamma-methacryloxypropyltriethoxysilane, gamma-methacryloxypropyl-tris(2-methoxyethoxy)silane, vinyltrimethoxysilane, vinyltriethoxysilane, vinyl-tris(2-methoxyethoxy)silane and the like. Of these organoalkoxysilanes, gamma-methacryloxypropyltrimethoxysilane is especially preferred.

The proportion of such crosslinking monomer employed in the practice of the invention may range from 0.5 percent to 15 percent by weight of the monomers used in the copolymerization process. When the crosslinking monomer is a mixture of alkylenimine and organoalkoxysilane, the mole ratio of the alkylenimine to the alpha, beta-ethylenically unsaturated monocarboxylic acid used to prepare the polymer is generally in the range of from 0.5:1 to 1.5:1 and the mole ratio of the organoalkoxysilane to the alpha, beta-ethylenically unsaturated monocarboxylic acid used to prepare the polymer is generally in the range of from 1.5:1 to 3.5:1.

The monoethylenically unsaturated monomer, acid monomer and crosslinking monomer are polymerized in a dispersing liquid which solubilizes the monomers but in which the resulting polymers are essentially not soluble and form dispersed polymer particles. The dispersing liquid is generally a hydrocarbon medium consisting essentially of liquid aliphatic hydrocarbons. A pure aliphatic hydrocarbon or a mixture of two or more may be employed. To the extent that any particular polymer produced is mostly insoluble in the hydrocarbon medium resulting, the essentially aliphatic hydrocarbon may be modified by the incorporation of other solvent materials such as aromatic or naphthenic hydrocarbons, and in certain instances, the amount of such non-aliphatic component may attain as high as 49 percent by weight of the entire liquid medium. However, the liquid medium preferably consists essentially of aliphatic hydrocarbons and, in general, the compositions contain less than 25 percent by weight based on the weight of the liquid medium of an aromatic hydrocarbon and often none at all at this stage.

It is essential that the hydrocarbon be of liquid character, but it may have a wide boiling range from a minimum of about 30° C. (in which case high pressures may be needed in the polymerization) to a maximum which may be as high as 300° C. For most purposes, the boiling point should be from about 50° C. up to about 235° C.

Examples of dispersing liquids useful herein are pentane, hexane, heptane, octane, mixtures of the same, and the like.

Ordinarily, the polymerizable composition of monomers and dispersing liquid should contain from about 30 to about 80 percent by weight of the dispersing liquid. It is understood, however, that the monomeric solution need contain only that amount of dispersing liquid necessary to solubilize the monomers and maintain the resulting polymers in a dispersed state after polymerization.

The monomers are polymerized in the presence of a dispersion stabilizer. The dispersion stabilizer employed in producing the microparticles of the invention is a compound, usually polymeric, which contains at least two segments of which one segment is solvated by the dispersing liquid and a second segment is of different polarity than the first segment and is relatively insoluble (compared to the first segment) in the dispersing liquid.

Included among such dispersion stabilizers are polyacrylates and polymethacrylates, such as poly(lauryl)-methacrylate and poly(2-ethylhexyl acrylate); diene polymers and copolymers such as polybutadiene and degraded rubbers; aminoplast resins, particularly highly naphtha-tolerant compounds such as melamine-formaldehyde resins etherified with higher alcohols (e.g., alcohols having 4 to 12 carbon atoms), for example, butanol, hexanol, 2-ethylhexanol, etc., and other aminoplasts of similar characteristics such as certain resins based on urea, benzoguanamine, and the like; and various copolymers designed to have the desired characteristics, for example, polyethylenevinyl acetate copolymers.

The presently preferred dispersion stabilizers used in this invention are graft copolymers comprising two types of polymer components of which one segment is solvated by the aliphatic hydrocarbon solvent and is usually not associated with polymerized particles of the polymerizable ethylenically unsaturated monomer and the second type is an anchor polymer of different polarity from the first type and being relatively non-solvatable by the aliphatic hydrocarbon solvent and capable of anchoring with the polymerized particles of the ethylenically unsaturated monomer, said anchor polymer containing pendant groups capable of copolymerizing with ethylenically unsaturated monomers.

The preferred dispersion stabilizers are comprised of two segments. The first segment (A) comprises the reaction product of (1) a long-chain hydrocarbon molecule which is solvatable by the dispersing liquid and contains a terminal reactive group and (2) an ethylenically unsaturated compound which is copolymerizable with the ethylenically unsaturated monomer to be polymerized and which contains a functional group capable of reacting with the terminal reactive group of the long-chain hydrocarbon molecule (1).

Generally, the solvatable segment (A) is a monofunctional polymeric material of molecular weight of about 300 to about 3,000. These polymers may be made, for example, by condensation reactions producing a polyester or polyether. The most convenient monomers to use are hydroxy acids or lactones which form hydroxy acid polymers. For example, a hydroxy fatty acid such as 12-hydroxystearic acid may be polymerized to form a non-polar component solvatable by such non-polar organic liquids as aliphatic and aromatic hydrocarbons. The polyhydroxy stearic acid may then be reacted with a compound which is copolymerizable with the acrylic monomer to be polymerized, such as glycidyl acrylate or glycidyl methacrylate. The glycidyl group would react with the carboxyl group of the polyhydroxy stearic acid and the polymer segment (A) would be formed.

Somewhat more complex, but still useful, polyesters may be made by reacting diacids with diols. For example, 1,12-dodecanediol may be reacted with sebacic acid or its diacid chloride to form a component solvatable by aliphatic hydrocarbons.

The preferred polymeric segment (A) of the dispersion stabilizer is formed by reacting poly-(12-hydroxystearic acid) with glycidyl methacrylate.

The second polymeric segment (B) of the dispersion stabilizer is of polarity different from the first segment (A) and, as such, is relatively non-solvated by the dispersing liquid and is associated with or capable of anchoring onto the acrylic polymeric particles formed by the polymerization and contains a pendant group which is copolymerizable with the acrylic monomer. This anchor segment (B) provides around the polymerized particles a layer of the stabilizer. The solvated polymer segment (A) which extends outwardly from the surface of the particles provides a solvated barrier which sterically stabilizes the polymerized particles in dispersed form.

The anchor segment (B) may comprise copolymers of (1) compounds which are readily associated with the acrylic monomer to be polymerized such as acrylic or methacrylic esters, such as methyl acrylate, methyl methacrylate, ethyl acrylate, ethyl methacrylate, butyl acrylate, butyl methacrylate, 2-ethylhexyl acrylate, octyl methacrylate, and the like, with (2) compounds which contain groups copolymerizable with the acrylic monomer to be polymerized and which contain groups which are reactive with the polymeric segment (A), such as glycidyl-containing acrylates and methacrylates, such as glycidyl acrylate and glycidyl methacrylate. These copolymers are further reacted with polymerizable ethylenically unsaturated acids, such as acrylic acid, methacrylic acid, 3-butenoic acid, crotonic acid, itaconic acid, and others mentioned previously which contain pendant groups which are copolymerizable with the acrylic monomer.

The preferred polymeric segment (B) is a terpolymer of methyl methacrylate, glycidyl methacrylate, and methacrylic acid.

The segments (A) and (B) are usually combined entities, the segment (A) being attached to the backbone of the graft copolymer and the segment (B) being carried in or on the backbone.

The monomer solution containing the stabilizer preferably contains from about 1 to about 25 percent by weight of the stabilizer. That is, the amount of dispersion stabilizer used is in the range of from about 1 to about 25 percent by weight based on the weight of monomers and dispersion stabilizer used in the copolymerization process.

The polymerization may be carried out in a conventional manner, utilizing heat and/or catalysts and varying solvents and techniques. Generally, a free radical catalyst such as cumene hydroperoxide, benzoyl peroxide or similar peroxygen compound, or an azo compound such as azobis(isobutyronitrile) is employed.

The resultant non-aqueous acrylic dispersion consists essentially of microgel particles (i.e., crosslinked acrylic polymer particles) dispersed therein. These particles have particle sizes ranging from 0.1 to 10 microns. Depending upon the original concentration of monomer solids, non-aqueous dispersions consisting essentially of the microgel particles can be produced by the process at relatively high concentrations. The term "relatively high concentration" as employed herein refers to solids level of the non-aqueous dispersion. Thus, the process permits the production of non-aqueous dispersions of microgel particles having solids contents of from 20 to 60 percent by weight or even higher. In the preparation of such polymeric microparticles, methyl methacrylate, methacrylic acid and glycidyl methacrylate are the especially preferred monomers.

A particularly preferred crosslinked acrylic polymer microparticle for use in the compositions of the invention is a crosslinked acrylic polymer microparticle formed by the free radical addition copolymerization of an alkyl acrylate or methacrylate; an alpha, beta-ethylenically unsaturated monocarboxylic acid; a hydroxyalkyl alkylenimine, and an organoalkoxysilane monomer; in the presence of the aliphatic hydrocarbon dispersing liquid and the above dispersion stabilizer. In preparing the particularly preferred microparticle, methyl methacrylate, methacrylic acid, hydroxyethyl ethylenimine, and gamma-methacryloxypropyltrimethoxysilane are expecially preferred monomers.

As indicated above and as described in the copending applications which have been incorporated herein by reference, the crosslinked acrylic polymer microparticles are prepared in the form of a non-aqueous dispersion of relatively high concentration. They generally have a particle size range of about 0.1 to about 10 microns. The crosslinked acrylic polymer microparticles utilized herein can be added to the solution of urethane reaction product and the curing agent, if any, in several ways. Thus, the non-aqueous dispersion of crosslinked microparticles can be directly added to the solution. If this method is employed, it is most convenient and preferred for purposes of compatibility and ease of mixing to first reduce or cut the dispersion with the same solvent utilized in the solution. Alternatively, the non-aqueous dispersion of crosslinked polymeric microparticles can be recovered, such as by spray drying with a conventional spray drier to form a finely divided powder which can then be redispersed in the same type solvent or solvent mixture employed in the solution and then added thereto, or in cases where pigmentation is desired, the powder itself can be added in with the grind vehicle.

In most cases, the overall composition may contain from about 30 percent to about 90 percent by weight of the urethane reaction product, from about 0 percent to about 50 percent by weight of curing agent, and from about 2 percent to about 50 percent by weight, preferably 2 to 20 percent by weight of the crosslinked acrylic polymer microparticles. Where it is desired to include a polymeric polyol, from about 2 to about 20 percent by weight may be employed. As will be understood, when a polymeric polyol is included in the composition, the amount of urethane reaction product and curing agent will be reduced accordingly, generally on a 1:1 basis.

The compositions may also contain other ingredients such as catalysts, plasticizers, fillers, pigments and the like. This invention is particularly useful in the deposition of films containing metallic flake pigments such as aluminum, nickel, stainless steel, or the like, as the pattern control of the resulting film is excellent.

The compositions are quite useful as coatings on substrates. The compositions are applied to the substrate and baked at 150° F. to 350° F. for about 5 to about 60 minutes to cure the coating on the substrate. The coatings may be applied by any conventional means such as spray coating, dip coating, roll coating, and the like. The preferred method is spray coating as the compositions containing crosslinked acrylic polymer microparticles can be applied with good deposition efficiency and rapid film build.

Any substrate such as paper, metal, wood, paperboard, plastic, foam, extruded rubber, and the like may be coated with the composition. The preferred substrates are resilient or rubbery substrates such as a foam or extruded, e.g., an automobile bumper or side shield.

The following examples set forth specific embodiments of the instant invention. However, the invention is not to be construed as being limited to these embodiments for there are, of course, numerous possible variations and modifications. All parts and percentages in the Examples as well as throughout the specification are by weight unless otherwise indicated.

EXAMPLE A

This example illustrates the preparation of insoluble crosslinked acrylic polymer microparticles utilized in the compositions of this invention.

To a 5-liter flask equipped with an up-and-over condenser, agitator, thermometer, and heating mantle was charged 1900 grams of Napoleum 30 (a medium boiling naphtha from Kerr-McGee Company), 950 grams of hexane, and 950 grams of heptane. The mixture was heated to reflux (about 85° C.) and then 200 grams of methyl methacrylate, 34 grams of a dispersion stabilizer solution and 14.3 grams of azobis(isobutyronitrile) were added. The dispersion stabilizer solution used contained 50.3 percent solids (viz., dispersion stabilizer) and the dispersion stabilizer was a polymer prepared by interpolymerizing 45.4 percent methyl methacrylate, 4.2 percent glycidyl methacrylate, 0.9 percent methacrylic acid, and 49.5 percent of a reaction product of 89.2 percent poly-12-hydroxystearic acid an 10.8 percent glycidyl methacrylate. The solvent of the dispersion stabilizer solution comprised 52.1 percent butyl acetate, 40.0 percent VM&P naphtha and 7.9 percent toluene. After this addition was complete, reflux was continued for about 20 minutes and then over a 3-hour period was added 4060 grams methyl methacrylate, 226 grams of gamma-methacryloxypropyltrimethoxysilane, 595 grams of the above dispersion stabilizer solution, 34.0 grams of methacrylic acid, 34.0 grams of 2-hydroxyethyl ethylenimine, 18.0 grams of azobis(isobutyronitrile) and 18 grams of p-octyl mercaptan. After this addition, reflux was continued for another 1.5 hours and the mixture was then cooled and filtered.

The resultant polymeric dispersion consisting essentially of crosslinked acrylic polymer particles (i.e., microgel particles) had a total solids content determined at 150° C. of 54.5 percent by weight.

The above dispersion was then spray dried to produce a finely divided powder. This powder was then dispersed in an aliphatic hydrocarbon solvent at a 1:1 ratio for use in the examples below.

EXAMPLE B

This example illustrates the preparation of a urethane reaction product component of the compositions of the invention.

The following were charged to a reaction vessel:

|  | Parts by Weight |
|---|---|
| Neopentyl glycol | 126.9 |
| Trimethylolpropane | 22.1 |
| Adipic acid | 72.3 |

-continued

| | Parts by Weight |
|---|---|
| Isophthalic acid | 123.2 |

This mixture was heated to 200° C. for 30 minutes and then at 220° C. until the resin had a Gardner-Holdt viscosity of F (60 percent solids in methyl ethyl ketone), and acid value of about 10 and a hydroxyl value of about 100. This polyester polyol was then mixed with the following:

| | Parts by Weight |
|---|---|
| Polyester polyol | 70 |
| Methyl ethyl ketone | 35 |
| Methane-bis(cyclohexyl isocyanate) - (Mobay D-244) | 7.13 |

This mixture was heated at 150° C. for 20 hours and then cooled to 120° F. for 3 more hours. There were then added 22 parts of n-butanol and 0.3 part of ethanolamine. The product had a Gardner-Holdt viscosity of $Z_1$–$Z_2$, a non-volatile solids content of about 60 percent and an acid value of 3.7.

EXAMPLE C

This example illustrates the preparation of a pigmented polyester urethane coating composition to which the crosslinked polymerized microparticles may be added to form the compositions of this invention.

A titanium dioxie pigmented polyester urethane coating composition was first formulated using the urethane reaction product of Example B by blending the following:

| | Parts by Weight |
|---|---|
| Urethane reaction product of Example B | 204.90 |
| Butylated melamine formaldehyde resin | 100.80 |
| CAB* solution | 4.2 |
| Pigment paste | 396.70 |
| Tinuvin 828 (ultraviolet absorber) | 8.5 |
| cellosolve acetate | 18.70 |
| Isobutyl alcohol | 30.90 |
| Santowhite | 8.5 |
| p-Toluene sulfonic acid | 2.80 |
| Isobutyl acetate | 216.0 |
| Diethanolamine | 1.0 |

*20 percent solution of 1/2 second cellulose acetate butyrate in 80/20 toluene/ethanol The pigment paste employed was ground in a solution of a polyester made from 131 parts of neopentyl glycol, 141 parts of sebacic acid, 174 parts of isophthalic acid, 93.6 parts of trimethylolpropane, and 8.5 parts hydroxyethyl ethylenimine; the paste was produced by mixing the following:

| | Parts by Weight |
|---|---|
| Polyester (60 percent solids in a 90:10 mixture of xylene and butyl Cellosolve) | 91.80 |
| Poly(oxytetramethylene)glycol | 26.20 |
| $TiO_2$ | 223.30 |
| Diacetone alcohol | 8.90 |
| Methyl ethyl ketone | 26.60 |
| Isobutyl acetate | 8.9 |

This mixture was ground in a ball mill until the particles had a fineness of 7.5 Hegman.

The coating composition thus obtained served as a control composition for the examples below and also as the base composition to which the crosslinked acrylic polymer microparticles were added.

EXAMPLE D

A polyester urethane coating composition was prepared as in Example C except that the titanium dioxide pigment was replaced by aluminum flake pigment at a level of 3 percent by weight. The composition also was utilized both as a control composition and as the basic composition to which the crosslinked acrylic polymer microparticles were added.

EXAMPLES 1-2

These examples illustrate the improvement in properties obtained by adding the crosslinked acrylic polymer microparticles to polyester urethane coating compositions.

| | Parts by Weight (Grams) | |
|---|---|---|
| | Example 1 (Control) | Example 2 |
| Polyester urethane of Example C | 200.0 | 200.0 |
| Crosslinked acrylic polymer microparticles of Example A | — | 8.0 |
| Total | 200.0 | 208.0 |

The above compositions were reduced 50 percent by volume with a 1:1 volumetric mixture of xylene an toluene, sprayed onto a panel, flashed for 2 minutes at room temperature, at which time another coat was applied and flashed for 5 minutes at room temperature and then baked at 250° F. for 30 minutes to cure.

The film build of Example 1 (no crosslinked polymeric microparticles) was 1.20 mils while the film build of Example 2 (8 parts crosslinked acrylic polymer microparticles) was 1.70 mils. The flow control of Example 2 was excellent compared to fair for the film of Example 1.

EXAMPLES 3-4

These examples further illustrate the effect of the crosslinked acrylic polymer microparticles on the properties of polyester urethane coating compositions.

| | Parts by Weight (Grams) | |
|---|---|---|
| | Example 3 (Control) | Example 4 |
| Polyester urethane of Example D | 200.0 | 200.0 |
| Crosslinked acrylic polymer microparticles of Example A | — | 8.0 |
| Total | 200.0 | 208.0 |

These compositions were reduced 50 percent by volume with a 1:1 volumetric mixture of xylene and toluene, and sprayed onto panels, utilizing the same procedure as in Examples 1 and 2. The film build of Example 3 (the control) was 1.3 mils while the film build of Example 4 was 1.9 mils. The pattern control of Example 3 was fair while that of Example 4 was excellent.

According to the provisions of the Patent Statutes, there are described above the invention and what are now considered to be its best embodiments. However, within the scope of the appended claims, it is to be understood that the invention can be practiced otherwise than as specifically described.

We claim:

1. In a polyurethane coating composition comprising an ungelled hydroxyl-containing urethane reaction product of an organic polyisocyanate and a polyhydric material having a hydroxyl value of at least 10, the improvement which comprises the presence therein of from about 2 percent to about 50 percent by weight, based on said coating composition, or insoluble crosslinked acrylic polymer microparticles formed by the free radical addition copolymerization of from about 0.5 percent to about 15 percent of alpha, beta-ethylenically unsaturated monocarboxylic acid, at least one other copolymerizable monoethylenically unsaturated monomer, and from about 0.5 percent to about 15 percent of crosslinking monomer selected from the group consisting of (1) epoxy group-containing compound and (2) a mixture of alkylenimine and organoalkoxysilane, wherein:
 a. said epoxy group-containing compound is monoepoxide compound which additionally contains ethylenic unsaturation,
 b. said organoalkoxysilane is selected from the group consisting of acrylatoalkoxysilane, methacrylatoalkoxysilane and vinylalkoxysilane, and
 c. said monomer percentages are based on the weight of monomers used in the copolymerization process,
in the presence of hydrocarbon dispersing liquid which is a solvent for the polymerizable monomers but a non-solvent for the resultant polymer, and polymeric dispersion stabilizer containing at least two segments of which one segment is solvated by said dispersing liquid and a second segment is of different polarity than said first segment and is relatively insoluble in said dispersing liquid, wherein the reaction is carried out at elevated temperature such that the dispersion polymer first forms and then is crosslinked.

2. The polyurethane coating composition of claim 1 wherein said alpha, beta-ethylenically unsaturated monocarboxylic acid is acrylic acid or methacrylic acid.

3. The polyurethane coating composition of claim 1 wherein said other copolymerizable monoethylenically unsaturated monomer is an alkyl acrylate or alkyl methacrylate.

4. The polyurethane coating composition of claim 1 wherein said other copolymerizable monoethylenically unsaturated monomer is methyl methacrylate.

5. The polyurethane coating composition of claim 1 wherein said crosslinking monomer is a monoepoxide compound which additionally contains ethylenic unsaturation.

6. The polyurethane coating composition of claim 5 wherein said monoepoxide compound which additionally contains ethylenic unsaturation is glycidyl methacrylate.

7. The coating composition of claim 1 wherein said crosslinking monomer is a mixture of alkylenimine and organoalkoxysilane selected from the group consisting of acrylatoalkoxysilane, methacrylatoalkoxysilane and vinylalkoxysilane.

8. The polyurethane coating composition of claim 7 wherein said alkylenimine is hydroxyethyl ethylenimine and said organoalkoxysilane is gamma-methacryloxypropyltrimethoxysilane.

9. The polyurethane coating composition of claim 1 wherein said polymeric dispersion stabilizer is a graft copolymer containing two polymeric segments of which one segment is solvated by said dispersing liquid and the second segment is an anchor polymer of different polarity to said first segment and is relatively nonsolvatable by said dispersing liquid and wherein said polymeric dispersion stabilizer contains pendant groups which have been addition copolymerized with the ethylenically unsaturated monomers in the copolymerization process.

10. The polyurethane coating composition of claim 9 wherein said polymeric dispersion stabilizer is formed by graft copolymerizing the reaction product of glycidyl methacrylate and poly-(12-hydroxystearic acid), with methyl methacrylate and glycidyl methacrylate and the resulting copolymer product containing pendant epoxy groups is reacted with methacrylic acid.

11. The polyurethane coating composition of claim 1 wherein said alpha, beta-ethylenically unsaturated monocarboxylic acid is methacrylic acid, said other copolymerizable monoethylenically unsaturated monomer is methyl methacrylate, and said crosslinking monomer is glycidyl methacrylate.

12. The polyurethane coating composition of claim 1 wherein said alpha, beta-ethylenically unsaturated monocarboxylic acid is methacrylic acid, said other copolymerizable monoethylenically unsaturated monomer is methyl methacrylate and said crosslinking monomer is a mixture of gamma-methacryloxypropyltrimethoxysilane and hydroxyethyl ethylenimine.

13. The polyurethane coating composition of claim 1 wherein said polyhydric material contains a polymeric polyol.

14. The polyurethane coating composition of claim 13 wherein said polymeric polyol is selected from the group consisting of polyester polyols, polyether polyols and acrylic polyols.

15. The polyurethane coating composition of claim 1 wherein said polyhydric material contains a total of not more than one gram-mole of compounds having a functionality of 3 or more per 500 grams of polyhydric material.

* * * * *

UNITED STATES PATENT AND TRADEMARK OFFICE
CERTIFICATE OF CORRECTION

PATENT NO. : 4,115,472

DATED : September 19, 1978

INVENTOR(S) : Samuel Porter, Jr. and Bruce N. McBane

It is certified that error appears in the above–identified patent and that said Letters Patent are hereby corrected as shown below:

Column 15, line 5, "or" should be --of--.

Signed and Sealed this

First Day of May 1979

[SEAL]

Attest:

RUTH C. MASON
Attesting Officer

DONALD W. BANNER
Commissioner of Patents and Trademarks